United States Patent
Cox et al.

(10) Patent No.: US 10,891,339 B2
(45) Date of Patent: *Jan. 12, 2021

(54) CATEGORIZED SOCIAL OPINIONS AS ANSWERS TO QUESTIONS

(71) Applicant: International Business Machines Corporation, Armonk, NY (US)

(72) Inventors: Susan M. Cox, Rochester, MN (US); Janani Janakiraman, Austin, TX (US); Nadiya Kochura, Bolton, MA (US); Fang Lu, Billerica, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 271 days.

This patent is subject to a terminal disclaimer.

(21) Appl. No.: 15/814,286

(22) Filed: Nov. 15, 2017

(65) Prior Publication Data

US 2018/0314760 A1    Nov. 1, 2018

Related U.S. Application Data

(63) Continuation of application No. 15/582,922, filed on May 1, 2017, now Pat. No. 10,540,409.

(51) Int. Cl.
    G06F 16/95    (2019.01)
    G06F 16/951   (2019.01)
    G06Q 50/00    (2012.01)

(52) U.S. Cl.
    CPC .......... *G06F 16/951* (2019.01); *G06Q 50/01* (2013.01)

(58) Field of Classification Search
    CPC .... G06F 16/951; G06F 16/9536; G06F 16/35; G06F 16/353; G06F 16/906; G06Q 50/01

USPC .......................... 707/706, 722, 723, 737, 754
See application file for complete search history.

(56) References Cited

U.S. PATENT DOCUMENTS

| | | | | |
|---|---|---|---|---|
| 2011/0106895 | A1* | 5/2011 | Ventilla | H04L 12/66 709/206 |
| 2012/0084112 | A1* | 4/2012 | Bagchi | G06Q 10/063112 705/7.14 |
| 2014/0272884 | A1* | 9/2014 | Allen | G06N 20/00 434/322 |
| 2014/0272885 | A1* | 9/2014 | Allen | G09B 7/02 434/322 |
| 2015/0261859 | A1* | 9/2015 | Isensee | G06F 16/287 707/723 |
| 2016/0125751 | A1* | 5/2016 | Barker | G06F 19/00 434/322 |

(Continued)

OTHER PUBLICATIONS

Appendix P, 2017.

*Primary Examiner* — Hares Jami
(74) *Attorney, Agent, or Firm* — Garg Law Firm, PLLC; Rakesh Garg; Noah Sharkan (57) ABSTRACT

A question is analyzed to determine a set of categories, a category corresponding to a type of possible answers responsive to the question. A set of opinions is extracted from social media data. Each opinion is from a corresponding responder on a social media platform to which the question is sent. An opinion from the set of opinions is categorized into a category from the set of categories. A strength of the opinion is computed using a subset of a set of strength parameters. The opinion is ranked according to the strength of the opinion. The opinion, the strength, and the category are presented in a filterable presentation.

14 Claims, 7 Drawing Sheets

(56) References Cited

U.S. PATENT DOCUMENTS

| | | | |
|---|---|---|---|
| 2016/0162790 A1* | 6/2016 | Gordon | G06F 16/3329 |
| | | | 706/11 |
| 2017/0032440 A1* | 2/2017 | Paton | H04L 51/02 |
| 2017/0223190 A1* | 8/2017 | Mandel | G06N 5/04 |
| 2018/0189260 A1* | 7/2018 | Kannan | G06F 40/274 |

* cited by examiner

CATEGORIZED SOCIAL OPINIONS AS ANSWERS TO QUESTIONS

TECHNICAL FIELD

The present invention relates generally to a method for finding answers to a user's query. More particularly, the present invention relates to a method for categorizing social opinions as answers to questions.

BACKGROUND

Presently, in order to find information, a user submits a search string to a search engine. The search engine selects from the information that the engine has indexed that information which is fully or partially related to the search string. Such selected information becomes the search engine's result set. The search engine uses a search algorithm to search the index, an ordering algorithm to arrange the result set in some order—generally an order of relevance to the question, age of the information, or both.

A user, who is a member of a social media platform can also ask a question in the user's social network. Asking a question to the social network is another way of finding information. A member of the social network responds to the question with an answer. The answer is generally an opinion of the responding member.

Hereinafter, a user can be a human, a system, or an application, unless expressly distinguished where used. Any reference to a query or a search query is a reference to a string of letter, words, or phrases in a natural language, which can be used to search a repository of information. The query need not be in any particular query language. A question is an expression in any suitable form of a desire to obtain information. An asker is a user who asks a question. A social media participant who responds to an asker's question is a responder or an answerer. The responder may be, but need not be, a member of the asker's social network. An answer provided by a responder is an opinion of the responder.

SUMMARY

The illustrative embodiments provide a method that analyzes a question to determine a set of categories, a category corresponding to a type of possible answers responsive to the question. The embodiment extracts from social media data a set of opinions, wherein each opinion is from a corresponding responder on a social media platform to which the question is sent. The embodiment categorizes an opinion from the set of opinions into a category from the set of categories. The embodiment computes a strength of the opinion using a subset of a set of strength parameters. The embodiment ranks the opinion according to the strength of the opinion. The embodiment presents the opinion, the strength, and the category in a filterable presentation.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that while there are some ways to organize and prioritize the search result set from a traditional internet search engine, opinions on social media are only presented to the asker as the opinions are posted. The illustrative embodiments recognize that presently, there does not exist a mechanism by which the opinions can be sought, collected, analyzed, organized, ranked according to their strengths, and presented in a drill-down or filterable manner to the asker.

For example, the illustrative embodiments recognize that different responders can have differing opinions on the same question. Presently, the asker is simply presented with the various opinions, and the asker has to review each one and determine the merits of each opinion. When numerous opinions are presented to the asker, a distinct risk exists that the asker may not read some of the opinions which could be valuable, or may interpret the opinion incorrectly, or may fail to attribute a correct weight or strength to the opinion in view of the current affairs, the state of other information existing on the internet and the relationship of the opinion with such information, and the like.

For example, an asker might want to weigh those opinions higher than others, which are supported by the responder's personal experience or other evidence. Some examples of such evidentiary support include but are not limited to a responder's own experience, an experience of a member of a social network of the responder, factual information available through traditional search, and the like. When manually scanning the opinions, an asker's ability is limited not only by the human effort involved, but also the unavailability or unawareness of such evidence to the human. A method for automatic analysis of opinions, classification into categories that are related to the question, computation of the strength or weight of the opinion according to a number of parameters, ranking of the opinions, and presenting in a filterable manner to the asker would therefore be useful.

The illustrative embodiments recognize that the presently available tools or solutions do not address these needs/problems or provide adequate solutions for these needs/problems. The illustrative embodiments used to describe the invention generally address and solve the above-described problems and other related problems by categorizing social opinions as answers to questions.

An embodiment can be implemented as a software application. The application implementing an embodiment, or one or more components thereof, can be configured as a modification of an existing social media platform—i.e., a native application in the social media platform, as an application executing in a data processing system communicating with an existing social media platform over a local area network (LAN)—i.e., a local application on the LAN, as an application executing in a data processing system communicating with an existing called system over a wide area network (WAN)—i.e., a remote application on the WAN, as a separate application that operates in conjunction with the existing social media platform in other ways, a standalone application, or some combination thereof.

An embodiment determines that an asker is expressing a need for information from social media. The embodiment determines the types of answers that are possible for the type of question the asker is asking. For example, some questions can be answered by affirmative or negative answer and various degrees thereof. As another example, some other questions can be answered by a variety of option. As another example, some other questions can be answered by anecdotal answers, factual answers, hypothetical answers, and experimental answers.

These examples of types of answers are not intended to be limiting. From this disclosure, those of ordinary skill in the art will be able to conceive many other answer types, and the same are contemplated within the scope of the illustrative embodiments.

Furthermore, in a particular embodiment, the types of answers that are suitable for a question can be determined by analyzing the question, e.g., using Natural Language Processing (NLP) to identify the topic and other characteristics of the question. Analyzing historical information about how users generally answer questions on that topic, or questions having those characteristics, is one example non-limiting manner of determining the types of answers that can be expected for the question. Such historical information can be obtained by data mining a social media data source, information available on the internet, or both.

Based on the identified types of answers that are possible for the type of question, the embodiment constructs a set of categories that correspond to the question. A category corresponds to a type of answers.

One embodiment further formats, arranges, composes, or otherwise reorganizes the question, if needed, to present to a social media platform for opinions. Another embodiment further formats, arranges, composes, or otherwise reorganizes the question, if needed, to present to a traditional search engine for obtaining a result set.

In response to the question, or a variation thereof, a social media data source returns social data that includes a set of opinions. An embodiment extracts the set of opinions from the social data. The embodiment analyzes an opinion to determine a category of the opinion, from the previously determined set of categories corresponding to the question. The embodiment classifies or categorizes the opinion into the determined category, and repeats the categorization process for other opinions in the set of opinions.

For the subset of opinions classified into a category, an embodiment computes a strength of the opinion. A strength of an answer, e.g., an opinion, is dependent upon one or more strength parameters. A strength parameter is a value computed using a particular aspect of the answer. Some non-limiting examples of strength parameters are as follows—

A personal language model—different responders use different manners of expressing their opinions. One responder may always show excitement in expressing an opinion, whereas another responder may always be cautious in expressing an opinion, regardless of how exciting or mundane the subject of those opinions might be. The value or strength of each opinion has to be scaled up or down depending upon the manner in which a particular responder uses the natural language. Accordingly, an embodiment obtains from the social data source historical data of the social media contributions by a responder. The embodiment analyzes the historical data of the responder to construct a responder-specific language model. The personal language model includes a set of entries, where an entry depicts a correspondence between a word or phrase used in an expression by the responder and an actual meaning or intent of the expression. The embodiment measures the language of the opinion using the responder-specific language model, to compute a language style-based strength parameter of the opinion.

A cultural model—different responders from different cultural backgrounds may express similar opinions differently (and different opinions in manners that may make them appear similar to one another). One responder may always be upfront and open about everything, whereas another responder may always be courteous and polite in expressing an opinion. The value or strength of each opinion has to be scaled up or down depending upon the cultural background of a particular responder. Accordingly, an embodiment obtains from the social data source historical data of the social media contributions by a responder. The embodiment also obtains from the social media information that is indicative of the responder's cultural background. The embodiment analyzes the historical data and the cultural information of the responder to construct a responder-specific cultural model. The cultural model includes a set of entries, where an entry depicts a correspondence between a culturally-influenced expression of the responder and an actual meaning or intent of the expression. The embodiment determines a correct meaning of the opinion using the responder-specific cultural model, to compute a culture-based strength parameter of the opinion.

Personal experience—different responders may have different personal experiences to support their opinion. The personal experience is one example form of evidentiary support for the opinion. One responder may actually have some personal experience with the subject of the responder's opinion, whereas another responder may be opining hypothetically and without any personal experience. Note that personal experience can be an experience of the responder or of another user where the other user and the other user's experience are known to the responder. The value or strength of each opinion is scaled up or down depending upon the personal experience of a particular responder. Accordingly, an embodiment obtains from the social data source historical data of the social media contributions by a responder. The embodiment analyzes the historical data of the responder to establish whether the responder or the responder's social network has any experience with the subject of the opinion. The embodiment computes an experience-based strength parameter of the opinion based on this analysis.

Other evidentiary support—in a similar manner, an embodiment determines whether some evidence exists to support a responder's opinion. In one example manner, the embodiment sends to a traditional search engine a search query corresponding to the question, and obtains a result set. The embodiment analyzes the search results in the result set to determine whether any information source has provided information that supports the opinion of the responder. The embodiment uses the analysis to compute a degree of evidentiary support that exists in the result set. The degree of evidentiary support depends on a number of results that support the opinion, a level at which the support is provided (e.g., completely supportive, marginally supporting, non-supporting, cautiously supportive, tentatively supportive, etc., and other levels of supports), a provenance of the information source that is providing the support, or a combination thereof. The embodiment computes an evidence-based strength parameter of the opinion based on this analysis.

Social media support—different opinions of different responders may be shared, liked, disliked, or commented upon by other social media users. This manner of social media interaction with an opinion is referred to herein as social media support for the opinion. The social media support is another example form of evidentiary support for the opinion. One opinion may be better supported in social media as compared to another opinion. The value or strength of each opinion has to be scaled up or down depending upon the personal experience of a particular responder. Accordingly, an embodiment obtains from the social data source social media support data corresponding to the opinion of a responder. The embodiment analyzes the social media support data to computes social media support-based strength parameter of the opinion.

These examples of manners of strength parameters and strength computations are not intended to be limiting. From this disclosure, those of ordinary skill in the art will be able to conceive many other strength parameters and strength computations and the same are contemplated within the scope of the illustrative embodiments.

Using the values computed for one or more strength parameters in this manner, an embodiment computes an overall strength value of the opinion. This overall strength value of the opinion is usable in ranking the opinion within the set of opinions. One embodiment computes the rank of an opinion across the subset of opinions that are within the category of the opinion. Another embodiment computes the ranking of the opinion across all opinions in the set of opinions regardless of the categories. Another embodiment also computes a strength of a category based on the strength of the constituent subset of opinions.

An embodiment presents the categorized and strength-ranked opinions to the asker. In one example, the highest-ranking opinion across all opinions in the set of opinions (and the opinion's category) may be listed first, followed by other opinions and their categories in progressively decreasing strength ranking. In another example, the category with the highest category strength may be listed first, followed by other categories in progressively decreasing category strengths. Within the categories listed in this manner, an embodiment lists the opinions of that category according to the opinions' strength rankings.

These example manners of presenting the opinions to the asker provide a mechanism for the asker to drill-down into the presentation of the opinions according to a variety of criteria, including but not limited to drill-down by category, category strength, opinion strength, and strength parameters used in the computation of opinion strengths. For example, the asker can filter (or drill-down) the presentation to show only those opinions that have personal experience based strength values in a specified range, or show only those opinions that have a certain cultural influence, or show only those opinions that have evidentiary support from an information source of a certain provenance, and so on.

The manner of categorizing social opinions as answers to questions described herein is unavailable in the presently available methods. A method of an embodiment described herein, when implemented to execute on a device or data processing system, comprises substantial advancement of the functionality of that device or data processing system in organizing the social opinions in response to questions in an effective, categorized, ranked, and filterable manner.

The illustrative embodiments are described with respect to certain types of questions, answers, opinions, strength parameters, computations, analyses, ranks, categories, drill-down or filtering, presentation, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
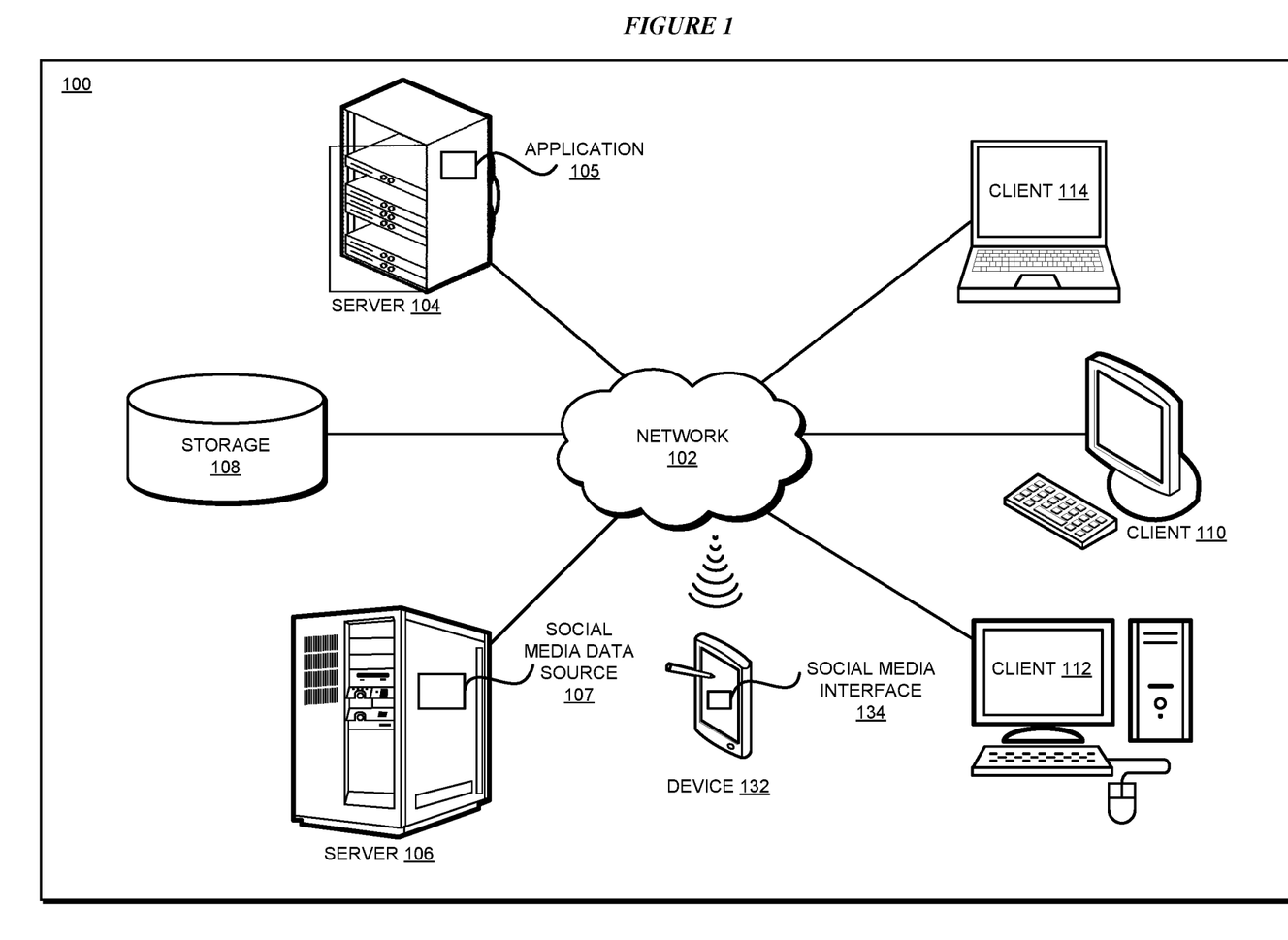
FIG. 1 depicts a block diagram of a network of data processing systems in which illustrative embodiments may be implemented.
Figure 2:
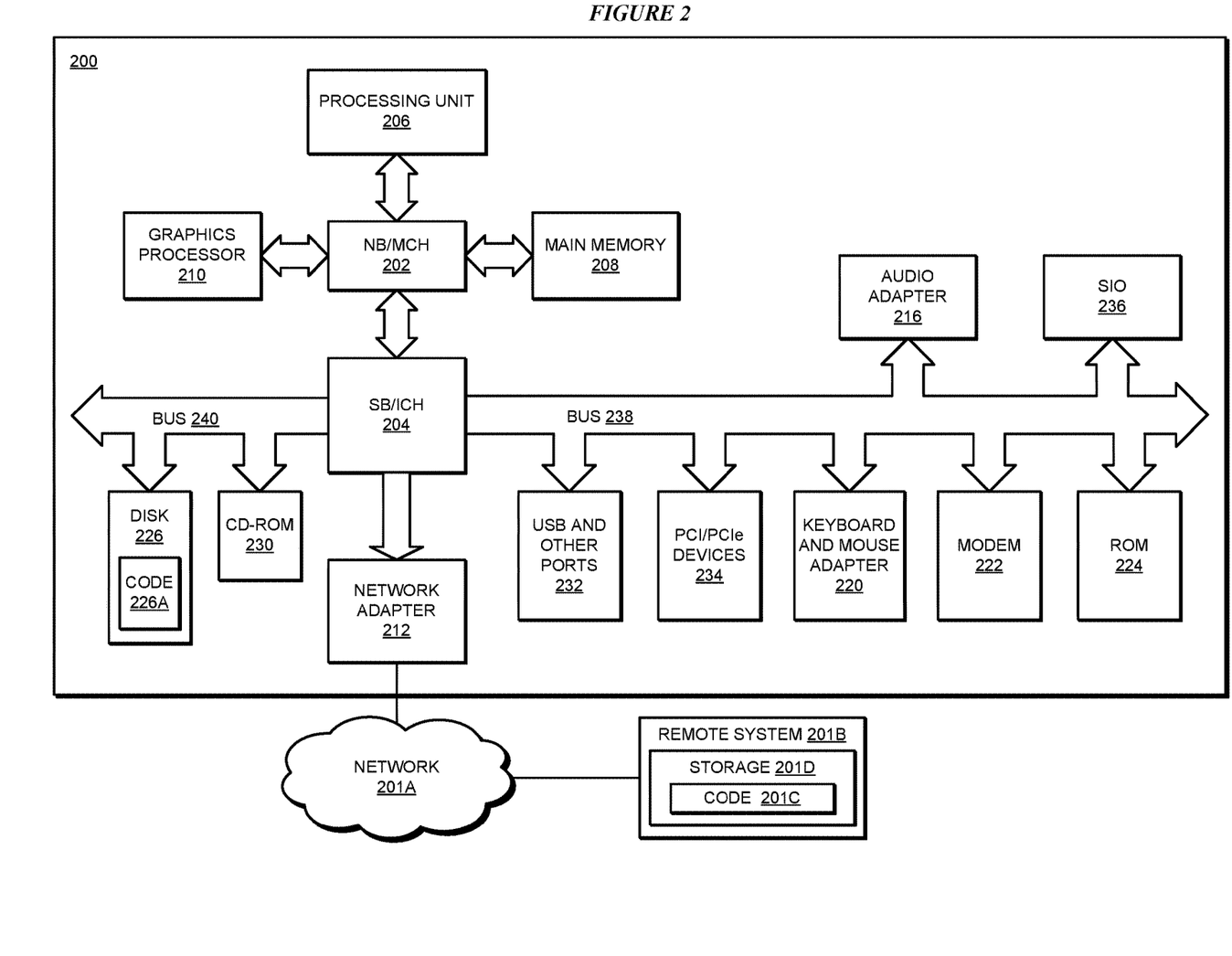
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 receives a question from a user of device 132, e.g., via social media interface 134 in device 132. Application 105 obtains social data from social media data source 107. Application 105 extracts, categorizes, and ranks the opinions from the social data. Application 105 presents the categorized and ranked opinions on social media interface 134. The user can drill-down or filter the presentation of the opinions using social media interface 134 or another application on device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
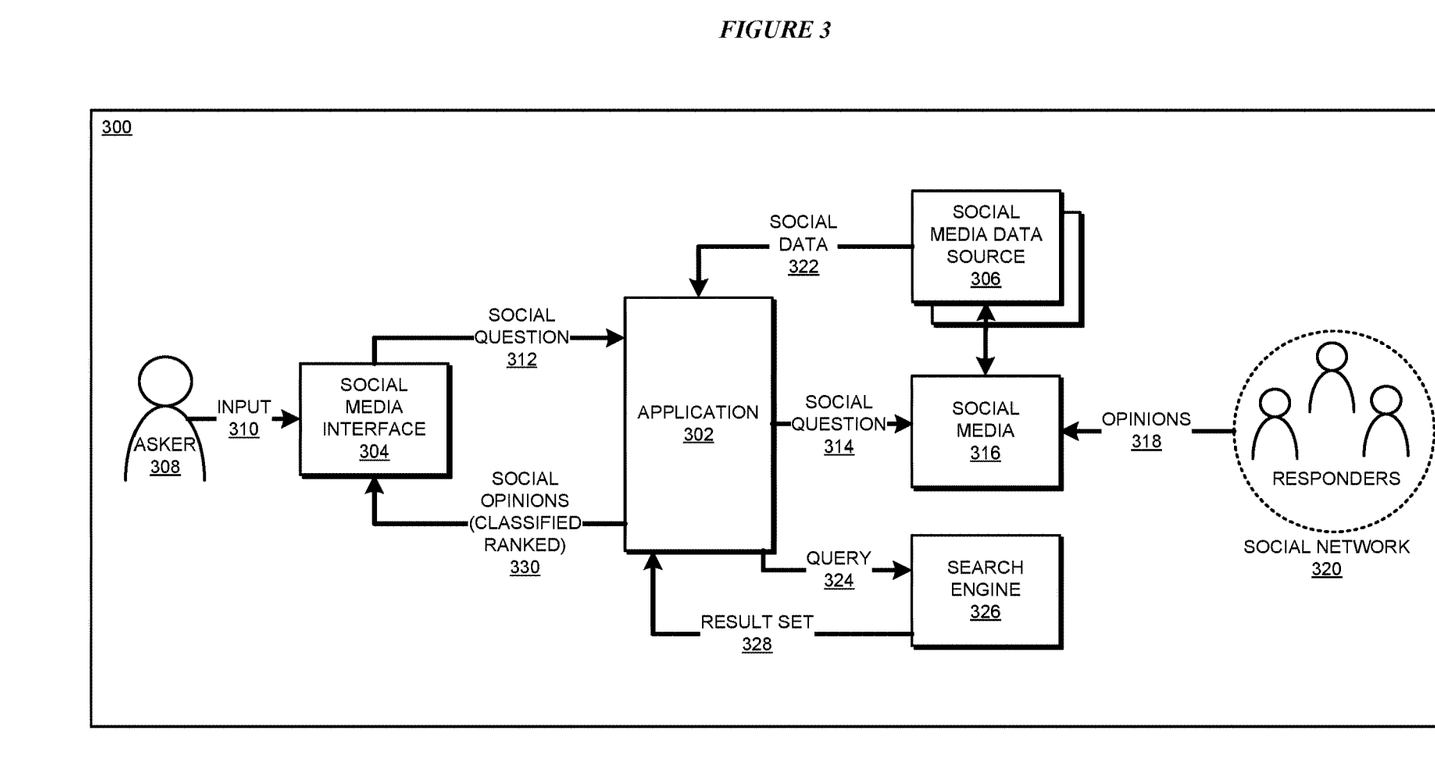
FIG. 3 depicts a block diagram of an example configuration for categorizing social opinions as answers to questions in accordance with an illustrative embodiment.

With reference to FIG. 3, this figure depicts a block diagram of an example configuration for categorizing social opinions as answers to questions in accordance with an illustrative embodiment. Application 302 is an example of application 105 in FIG. 1. Social media interface 304 is an example of social media interface 134 in FIG. 1. Social media data source 306 is an example of social media data source 107 in FIG. 1.

Asker 308 provides input 310 to interface 304. Input 310 is any suitable manner of expressing an interest in obtaining information, i.e., a question. Interface 304 sends question 312 to application 302. Question 312 may be the same as input 310 or a modified form of input 310, depending upon the implementation.

Application 302 presents question 314 to social media platform 316. Question 314 may be the same as question 312 or a modified form of question 312, depending upon the implementation. Presenting question 314 causes social media platform 316 to collect opinions 318 from responders in social network 320. Source 306 send social data 322, which includes opinions 318 and other information as described herein.

In order to collect evidence of support for an opinion, application 302 also constructs query 324 and sends to traditional search engine 326. Query 324 may be the same as question 312 or a modified form of question 312, depending on the implementation. Search engine 326 returns result set 328 to application 302.

Application 302 classifies the opinions from social data 322 into one or more categories suitable for question 312. Application 302 computes a strength of an opinion using portions of social data 322, result set 328, or both, as the case may be. Application 302 computes one or more of a category strength, a within-category ranking of opinions, an overall ranking of opinions, and a ranking based on a specific type of strength parameter.

Application 302 returns categorized and ranked options 330 to interface 304 for presenting to asker 308. Asker 308 can drill-down or filter options 330 in a manner described herein.

Figure 4:
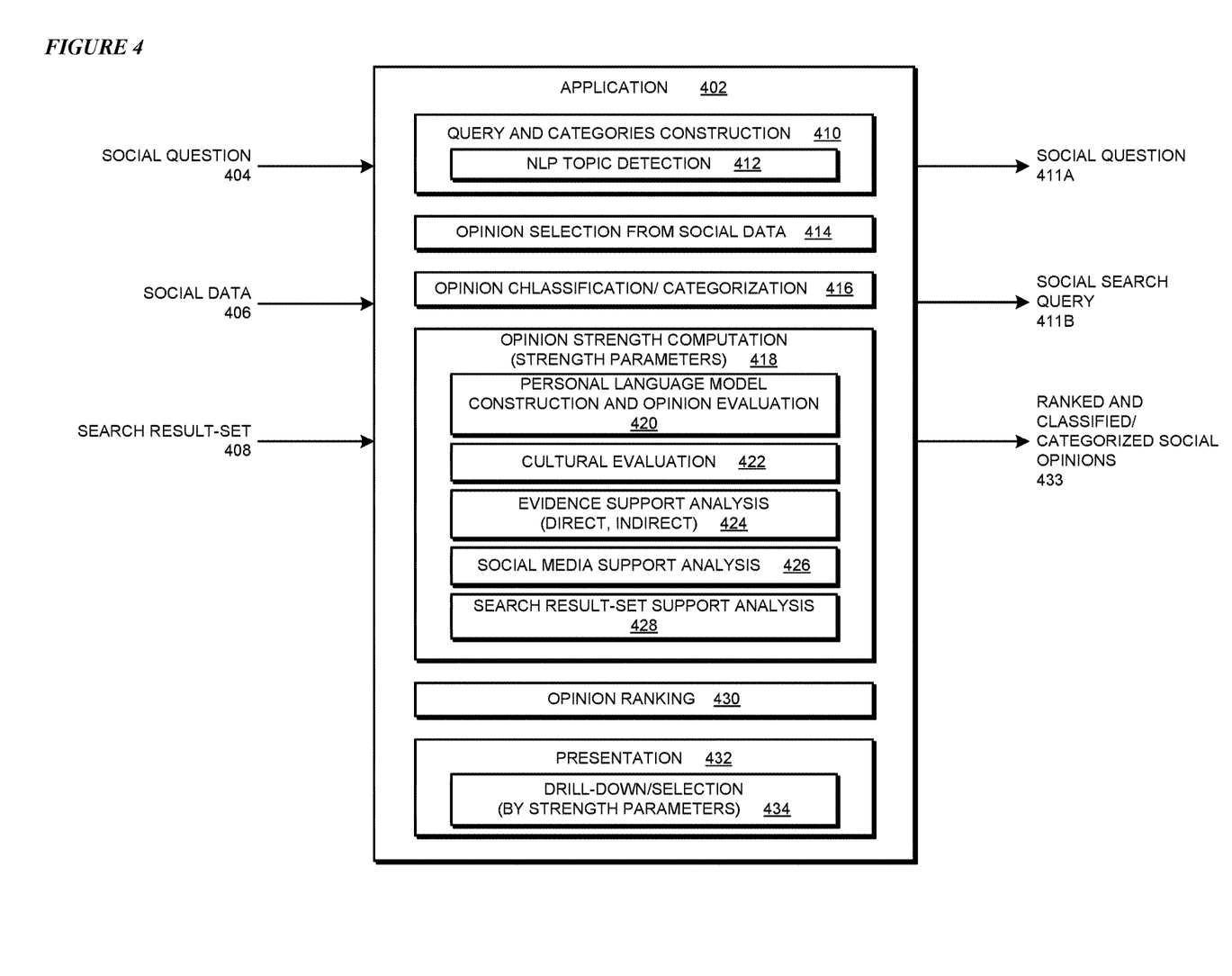
FIG. 4 depicts a block diagram of an application for categorizing social opinions as answers to questions in accordance with an illustrative embodiment.

With reference to FIG. 4, this figure depicts a block diagram of an application for categorizing social opinions as answers to questions in accordance with an illustrative embodiment. Application 402 can be used as application 302 in FIG. 3.

Application 402 receives input 404, which is a question similar to question 312 in FIG. 3. Application 402 receives input 406, which is social data similar to social data 322 in FIG. 3. Application 402 receives input 408, which is a result set similar to result set 328 in FIG. 3.

Component 410 uses input question 404 to construct a social search query, e.g., question 411A similar to question 314 in FIG. 3, query 411B similar to query 324 in FIG. 3, or both. Social data 406 is responsive to question 411A. Result set 408 is responsive to query 411B.

Component 410 also constructs a set of categories corresponding to input question 404. For example, subcomponent 412 uses an NLP engine to determine a topic of input question 404.

Component 414 identifies a set of opinions included in social data input 406, and extracts the set from input 406. Component 416 categorizes the opinions in a manner described herein using the categories constructed by component 410. Machine learning can be used to train opinion classifier component 416 using the opinions presented to component 416, e.g., to learn the opinion intent in phrases and sentences and to classify opinion statements with various levels of the opinion strengths.

Component 418 computes one or more strength parameters to compute a strength of an opinion. As one non-limiting example, subcomponent 420 computes a strength parameter by building a personal language model for a responder, and evaluating the responder's opinion relative to the responder-specific language model.

As another non-limiting example, subcomponent 422 computes a strength parameter by building a personal cultural model for a responder, and evaluating the responder's opinion relative to the responder-specific cultural model. As another non-limiting example, subcomponent 424 computes a strength parameter by analyzing direct or indirect support for a responder's opinion in social data 406, e.g., in the form of personal experience of the responder or a user known to the responder. Subcomponent 424 evaluates the responder's opinion based on such support.

As another non-limiting example, subcomponent 426 computes a strength parameter by analyzing social media support for a responder's opinion in social data 406, e.g., in the form of shares, likes, comments relative to the responder's opinion. Subcomponent 426 evaluates the responder's opinion based on such social media support. As another non-limiting example, subcomponent 428 computes a strength parameter by analyzing result set 408 to find a degree of support for a responder's opinion. Subcomponent 428 evaluates the responder's opinion based on such support.

Component 430 ranks the opinions in one or more manners described herein. Component 432 constructs presentation 433 of ranked and categorized opinions. Subcomponent 434 provides one or more methods of drilling down in presentation 433 in a manner described herein.

It is possible that for some questions, competing opinions might appear with substantially equal strengths. In some cases, different categories of opinions having substantially equal strengths, or different opinions having comparable strengths might be acceptable to the user. In other cases, resolving a clear winner, i.e., finding a singular category with the highest strength, or a singular opinion with the highest strength might be desirable.

In such cases, where a tie between categories or opinions has to be broken, an embodiment can be adapted to add a loop in the question answer method whereby a question can be modified based on the answers in the first iterations. The modified embodiment can be configured to present a second question as a follow-up. In one adaptation, the embodiment constructs the follow-up question automatically based on the competing opinions or categories of opinions received in the previous iteration. In another adaptation, the embodiment allows the user to construct the follow-up question upon the presentment of the competing opinion or categories.

For example, the user reviews the categorized and ranked opinions. The user determines that at least two opinions or categories are ranked substantially equally, or another reason exists in the categorized and ranked opinions to ask a follow-up question. The user composes and presents a follow-up question in the manner of question 404.

Figure 5A:
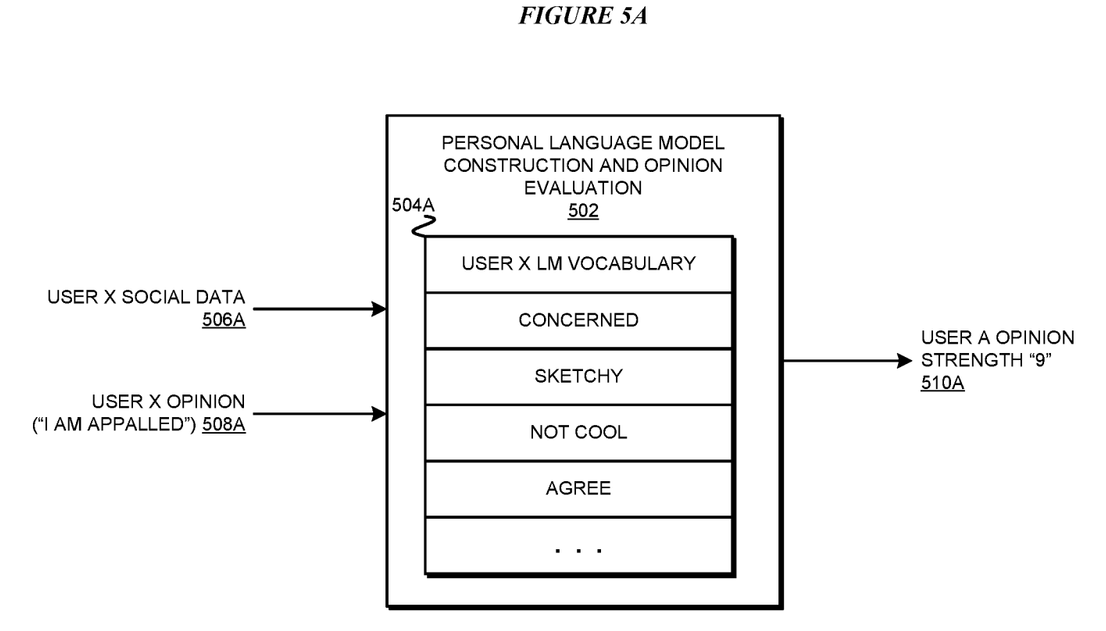
FIG. 5A depicts a block diagram of an example manner of constructing and using a responder-specific language model in accordance with an illustrative embodiment.

With reference to FIG. 5A, this figure depicts a block diagram of an example manner of constructing and using a responder-specific language model in accordance with an illustrative embodiment. Component 502 implements the functionality in the manner of subcomponent 420 of FIG. 4.

Responder-specific language model 504A is constructed for responder X. Assume that responder X has expressed an opinion "I am appalled" in response to a question from an asker. Component 502 receives input 506A, which is the historical social data of responder X. Component 502 also receives opinion 508A, which is the example opinion of responder X described above.

Using social data 506A, model 504A constructs a language model vocabulary specific to responder X. In the depicted example, component 502 has determined that responder X is prone to using mild words or phrases of expression, such as "concerned", "sketchy", "not cool", "agree", etc. Accordingly, model 504A includes such words or some linguistic expression thereof, as shown.

Measuring opinion 508A against model 504A, component 502 finds that opinion 508A is more strongly expressed than what model 504A suggests for responder X. Accordingly, component 502 scales up the strength of opinion 508A, e.g., to strength 510A, which is depicted as a non-limiting example value of 9 on an arbitrary scale of 1-10.

Figure 5B:
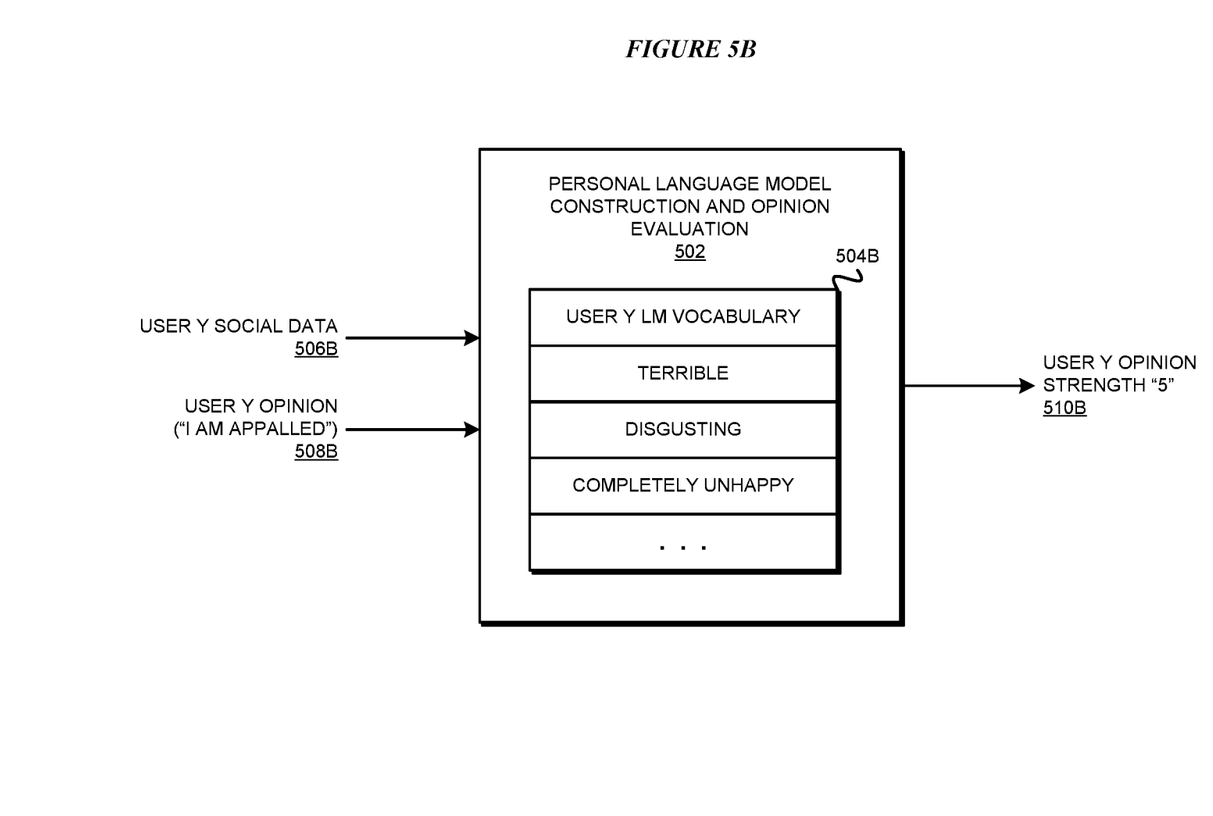
FIG. 5B depicts a block diagram of an example manner of constructing and using a responder-specific language model in accordance with an illustrative embodiment.

With reference to FIG. 5B, this figure depicts a block diagram of an example manner of constructing and using a responder-specific language model in accordance with an illustrative embodiment. Component 502 implements the functionality in the manner of subcomponent 420 of FIG. 4.

Responder-specific language model 504B is constructed for responder X. Assume that responder X has expressed an opinion "I am appalled" in response to a question from an asker. Component 502 receives input 506B, which is the historical social data of responder Y. Component 502 also receives opinion 508B, which is the example opinion of responder Y described above.

Using social data 506B, model 504B constructs a language model vocabulary specific to responder Y. In the depicted example, component 502 has determined that responder Y is prone to using superlative words or phrases of expression, such as terrible, disgusting, completely unhappy, etc. Accordingly, model 504B includes such words or some linguistic expression thereof, as shown.

Measuring opinion 508B against model 504B, component 502 finds that opinion 508B is expressed approximately with the same vigor as what model 504B suggests for responder Y. Accordingly, component 502 scales down, or does not adjust, the strength of opinion 508B, e.g., to strength 510B, which is depicted as a non-limiting example value of 5 on an arbitrary scale of 1-10.

Figure 6:
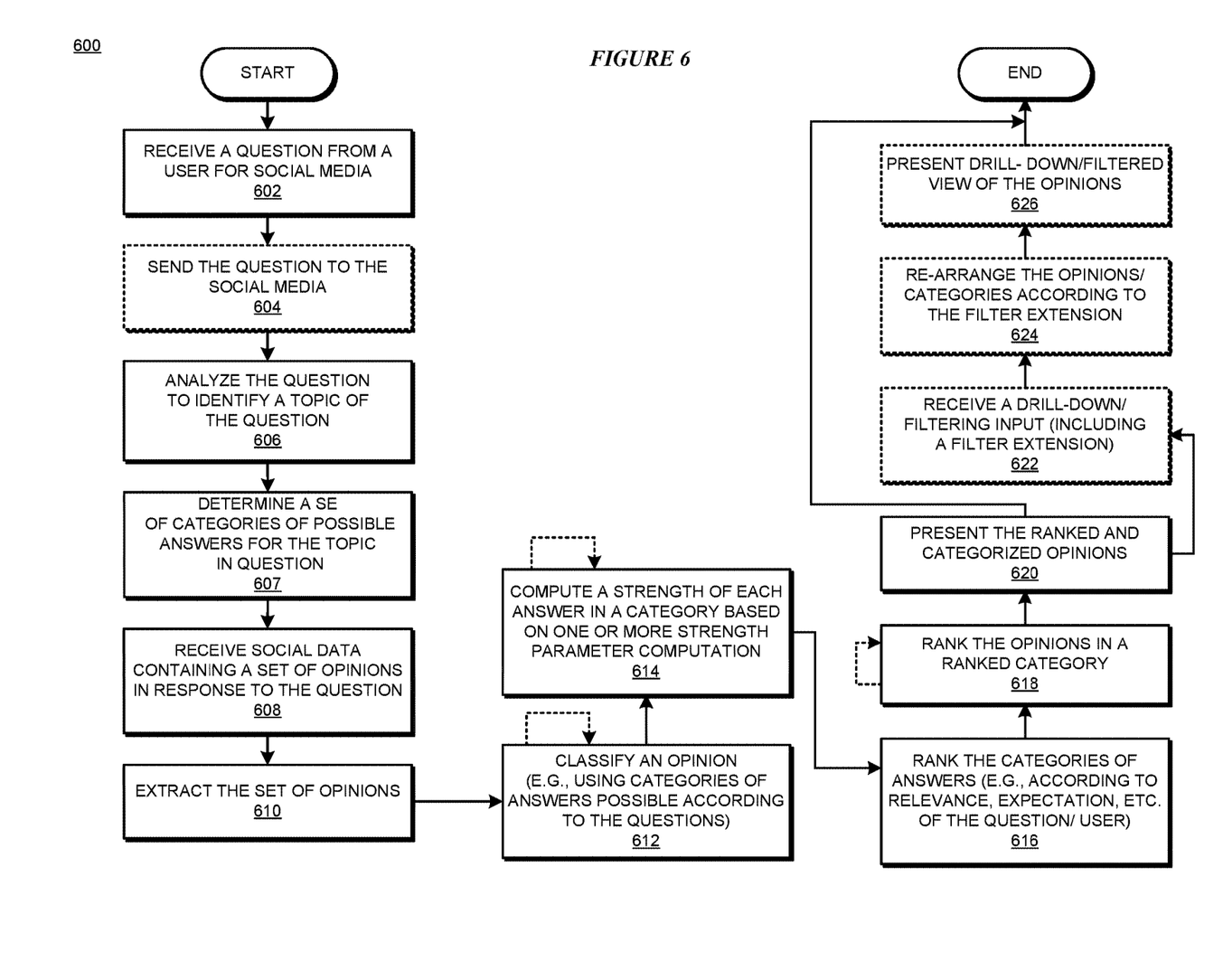
FIG. 6 depicts a flowchart of an example process for categorizing social opinions as answers to questions in accordance with an illustrative embodiment.

With reference to FIG. 6, this figure depicts a flowchart of an example process for categorizing social opinions as answers to questions in accordance with an illustrative embodiment. Process 600 can be implemented in application 402 in FIG. 4.

The application receives from an asker a question for a social media platform (block 602). The application optionally sends the question or a version thereof to the social media platform if the question has not already been send to the platform (block 604).

The application analyzes the question to identify a topic of the question (block 606). The application determines a set of categories of answers that are possible for the topic in question (block 607).

The application receives social data containing a set of opinions in response to the question (block 608). The application extracts the set of opinions from the social data (block 610).

The application classifies an opinion into one or more categories from block 607 (block 612). The application repeats block 612 for any number of opinions.

The application computes a strength of each opinion in a category, based on one or more strength parameter computations, as described herein (block 614). The application repeats block 614 for any number of strength computations.

The application ranks the categories according to category-strength, relevance to the question, expectation of the asker or the question, or some combination of these and other considerations (block 616). The application ranks the opinions in a category, which itself may be ranked among the set of categories according to block 616 (block 618). The application repeats block 618 for any number categories and the opinions therein.

The application presents the ranked and categorized opinions to the asker (block 620). The application may end process 600 thereafter, or may optionally provide additional functionality as described in blocks 622-626.

For example, the application may receive a drill-down or filtering input from the asker upon presentation from block 620 (block 622). The application re-arranges the opinions and/or the categories according to input (block 624). The application presents the drilled-down or filtered view of the opinions (block 626). The application ends thereafter.

Thus, a computer implemented method is provided in the illustrative embodiments for categorizing social opinions as answers to questions and other related features, functions, or operations. Where an embodiment or a portion thereof is described with respect to a type of device, the computer implemented method, or a portion thereof, is adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of computing, by a processor and a memory device, an opinion as an answer to a question, comprising:
    analyzing, by the processor, the question to determine a set of categories, a category corresponding to a type of possible answers responsive to the question, wherein the type of possible answers responsive to the question is determined using a Natural Language Processing analysis to identify a characteristic of the question;
    extracting, from the memory device, a set of opinions from social media, wherein each opinion is from a corresponding responder on a social media platform to which the question is sent;
    computing, by the processor, a responder-specific language model corresponding to a responder of the opinion, the responder-specific language model constructed using an analysis of historical social data of the responder, wherein the responder-specific language model establishes a threshold degree of sentiment used by the responder in the historical social data;
    computing, by the processor, a value of a responder-specific language strength parameter for the opinion, wherein the responder-specific language strength parameter is indicative of a degree of sentiment of the opinion relative to the threshold degree of sentiment used by the responder;
    computing, by the processor, a strength of the opinion using a subset of a set of strength parameters, a strength parameter in the subset comprising the responder-specific language strength parameter for the opinion;
    ranking, by the processor, the opinion according to the strength of the opinion;
    storing the opinion, the strength of the opinion, and the category into the memory device; and
    presenting the opinion, the strength of the opinion, and the category in a filterable presentation.

2. The method of claim 1, further comprising:
    computing, by the processor, a responder-specific cultural model corresponding to a responder of the opinion;
    computing, by the processor, a value of a responder-specific cultural strength parameter for the opinion, wherein the strength of the opinion uses the value of the responder-specific cultural strength parameter for the opinion.

3. The method of claim 2, further comprising:
analyzing, by the processor, historical social data of the responder to construct the responder-specific cultural model, wherein the responder-specific cultural model establishes a culturally-specific manner of expressing sentiments used by the responder in the historical social data, and wherein the responder-specific cultural strength parameter is indicative of a degree of sentiment of the opinion relative to the culturally-specific manner of expressing sentiments used by the responder.

4. The method of claim 1, further comprising:
analyzing, by the processor, historical social data of the responder to determine whether the responder has a personal experience supporting the opinion; and
computing, by the processor, a value of an evidentiary support strength parameter for the opinion according to a degree of support provided to the opinion by the personal experience of the responder.

5. The method of claim 1, further comprising:
analyzing, by the processor, a result set obtained from an internet search engine responsive to a query, the query corresponding to the question;
determining from analyzing the result set whether supporting information is available from an information source to support the opinion; and
computing, by the processor, a value of an evidentiary support strength parameter for the opinion according to a degree of support provided to the opinion by the supporting information.

6. The method of claim 1, wherein the presentation is filterable according to a strength parameter associated with the opinion.

7. The method of claim 1, wherein the presentation is filterable according to the category associated with the opinion.

8. The method of claim 1, wherein the presentation is filterable according to a cultural strength parameter associated with the opinion.

9. The method of claim 1, wherein the ranking ranks the opinion in the set of opinions.

10. The method of claim 1, wherein the ranking ranks the opinion in a subset of opinions that are in the category.

11. The method of claim 1, further comprising:
computing, by the processor, a category strength using the strengths associated with each opinion in the category, and wherein the category is positioned in the presentation according to the category strength.

12. The method of claim 1, further comprising:
receiving an expression of a need for social information;
transforming the expression into the question; and
submitting the question to the social media platform.

13. The method of claim 12, further comprising:
transforming the expression into a search engine query for an internet search engine.

14. The method of claim 1, further comprising:
analyzing, by the processor, the question, using Natural Language Processing, to identify a topic of the question; and
analyzing, by the processor, historical data from a data source to determine a set of types of answers that are possible in response to the topic, wherein the type of possible answers responsive to the question is in the set of types.

* * * * *